미국 특허 문서

(12) United States Patent
Nakano et al.

(10) Patent No.: US 11,897,542 B2
(45) Date of Patent: Feb. 13, 2024

(54) POWER SUPPLY DEVICE MOUNTING STRUCTURE

(71) Applicant: HONDA MOTOR CO., LTD., Tokyo (JP)

(72) Inventors: Kazuya Nakano, Saitama (JP); Kazuto Yamane, Saitama (JP); Masaki Takahashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 428 days.

(21) Appl. No.: 17/200,306

(22) Filed: Mar. 12, 2021

(65) Prior Publication Data

US 2021/0291905 A1    Sep. 23, 2021

(30) Foreign Application Priority Data

Mar. 17, 2020 (JP) ................................ 2020-046432

(51) Int. Cl.
*B60K 1/04* (2019.01)
*B62D 21/15* (2006.01)

(52) U.S. Cl.
CPC ................ *B62D 21/15* (2013.01); *B60K 1/04* (2013.01); *B60K 2001/0433* (2013.01); *B60Y 2306/01* (2013.01)

(58) Field of Classification Search
CPC ............ B62D 21/15; B60K 2001/0033; B60Y 2306/01
See application file for complete search history.

(56) References Cited

U.S. PATENT DOCUMENTS

| 2008/0000703 A1* | 1/2008 | Shindou .............. H01M 50/244 180/68.5 |
| 2015/0243950 A1 | 8/2015 | Hara et al. |
| 2017/0267059 A1 | 9/2017 | Koyama et al. |
| 2018/0075996 A1* | 3/2018 | Narisawa ............... H01H 85/25 |

(Continued)

FOREIGN PATENT DOCUMENTS

| JP | 2013-248969 A | 12/2013 |
| JP | 2015-157584 A | 9/2015 |

(Continued)

OTHER PUBLICATIONS

Kida et al., Protective Structure of Service Disconnector, Dec. 12, 2013, EPO, JP 213-248969 A, Machine Translation of Description (Year: 2013).*

(Continued)

*Primary Examiner* — James A English
(74) *Attorney, Agent, or Firm* — Paratus Law Group, PLLC (57) ABSTRACT

A power supply device mounting structure for a power supply device disposed below a seat disposed in a vehicle interior is provided. The power supply device mounting structure includes a plate member and a contact portion. The plate member is disposed between the power supply device and a seat surface portion of the seat and the plate member covers an upper surface of the power supply device. The contact portion is provided at a position facing an edge portion of the plate member and the contact portion comes into contact with the seat surface portion when a load is input from the seat surface portion.

6 Claims, 7 Drawing Sheets

(56) References Cited

U.S. PATENT DOCUMENTS

| | | | |
|---|---|---|---|
| 2019/0181398 A1 | 6/2019 | Shimada | |
| 2020/0282845 A1* | 9/2020 | Sawatzki | ................ B60L 50/64 |
| 2022/0089039 A1* | 3/2022 | Sassi | ........................ B60K 1/04 |

FOREIGN PATENT DOCUMENTS

| | | | |
|---|---|---|---|
| JP | 2015-217820 A | 12/2015 |
| JP | 2017-105275 A | 6/2017 |
| JP | 2017-132368 A | 8/2017 |
| JP | 2017-165305 A | 9/2017 |
| JP | 2019-001190 A | 1/2019 |
| JP | 2019-106303 A | 6/2019 |

OTHER PUBLICATIONS

Dec. 7, 2021, Japanese Office Action issued for related JP Application No. 2020-046432.

\* cited by examiner

POWER SUPPLY DEVICE MOUNTING STRUCTURE

CROSS-REFERENCE TO RELATED APPLICATIONS

The present application claims the benefit of priority of Japanese Patent Application No. 2020-046432, filed on Mar. 17, 2020, the content of which is incorporated herein by reference.

TECHNICAL FIELD

The present invention relates to a power supply device mounting structure on an electric vehicle or the like.

BACKGROUND ART

In a vehicle disclosed in JP2017-132368A, a battery is mounted below a seat cushion, and a rigidity disconnection point is provided that allows the floor to be deformed when a downward load equal to or greater than a predetermined value is applied from the seat side so that a battery mounting region is lowered. Accordingly, it is possible to lower the possibility of damaging the battery at the time of a frontal collision or the like of the vehicle.

SUMMARY

However, as disclosed in JP2017-132368A, in a case where a rigid disconnection point that allows the floor to be deformed is provided, for example, there is a concern that a floor may deform when an occupant depresses the floor or when luggage is placed on the floor. When performing design in consideration of this, it is necessary to devise a structure in a complicated manner so that deformation at the time of a frontal collision is allowed and deformation due to a load input in a normal state from an occupant or luggage is not caused.

An object of the present invention is to provide a power supply device mounting structure capable of reducing an influence on both a battery and a seat due to contact therewith at the time of a frontal collision or the like.

According to an aspect of the present invention, there is provided a power supply device mounting structure for a power supply device disposed below a seat disposed in a vehicle interior. The power supply device mounting structure including:
  a plate member that is disposed between the power supply device and a seat surface portion of the seat and covers an upper surface of the power supply device; and
  a contact portion that is provided at a position facing an edge portion of the plate member and that comes into contact with the seat surface portion when a load is input from the seat surface portion.

According to the present invention, for example, when a load is applied downward from the seat surface portion of the seat via an occupant at the time of a frontal collision or the like of a vehicle, the contact portion comes into contact with a lower surface of the seat surface portion of the seat. Accordingly, the edge portion of the plate member can be prevented from coming into contact with the lower surface of the seat surface portion of the seat, and damage to both the seat surface portion of the seat and the plate member can be prevented.

DESCRIPTION OF EMBODIMENTS

Hereinafter, an embodiment of the present invention will be described with reference to FIGS. 1 to 7. The drawings are to be viewed from a direction of reference signs, and in the following descriptions, front, rear, left, right, up and down are based on directions viewed from a driver. A front side of a vehicle in the drawings is denoted by Fr, a rear side thereof is denoted by Rr, a left side thereof is denoted by L, a right side thereof is denoted by R, an upper side thereof is denoted by U, and a lower side thereof is denoted by D.

[Vehicle]

Figure 1:
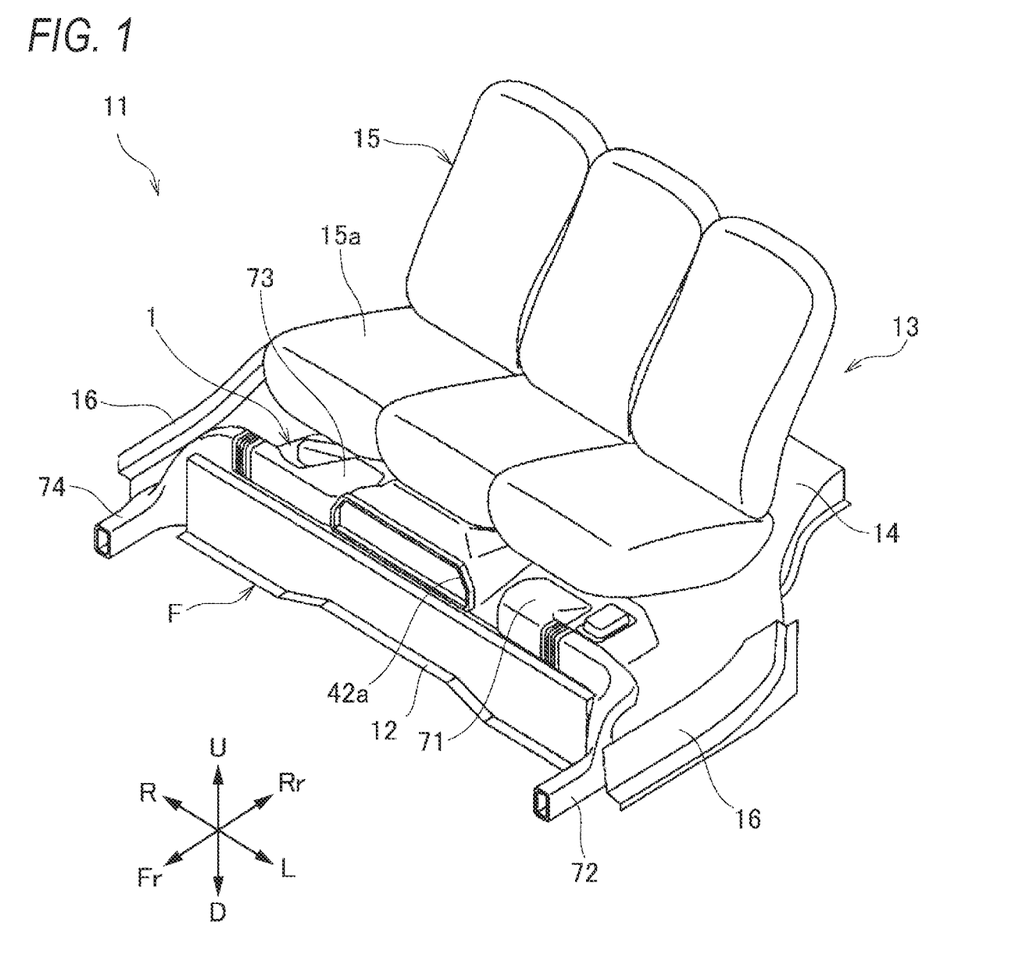
FIG. 1 is a perspective view of a periphery of a rear seat of a vehicle to which a power supply device mounting structure according to an embodiment of the present invention is applied, as viewed obliquely from an upper front side.

As illustrated in FIG. 1, the vehicle of the present embodiment is, for example, a hybrid vehicle, and a battery unit 1 that accommodates a battery 2 (see FIG. 3) is mounted in a vehicle interior 11. The battery unit 1 is disposed in an accommodating recess (not shown) recessed in a floor panel F, and is fastened to the floor panel F.

In the floor panel F, a front floor panel 12 constituting a floor portion of the vehicle interior 11 and a rear floor panel 14 constituting a floor portion or the like of a cargo compartment 13 are connected to each other below a rear seat 15, and both end portions of the floor panel F in a vehicle width direction are connected to a pair of left and right frame members 16 extending along a front-rear direction. The accommodating recess is formed below the rear seat 15, and an upper surface of the battery unit 1 accommodated in the accommodating recess faces or abuts against a lower surface 15b (see FIGS. 5 and 7) of a seat surface portion 15a of the rear seat 15.

[Battery Unit]

Figure 2:
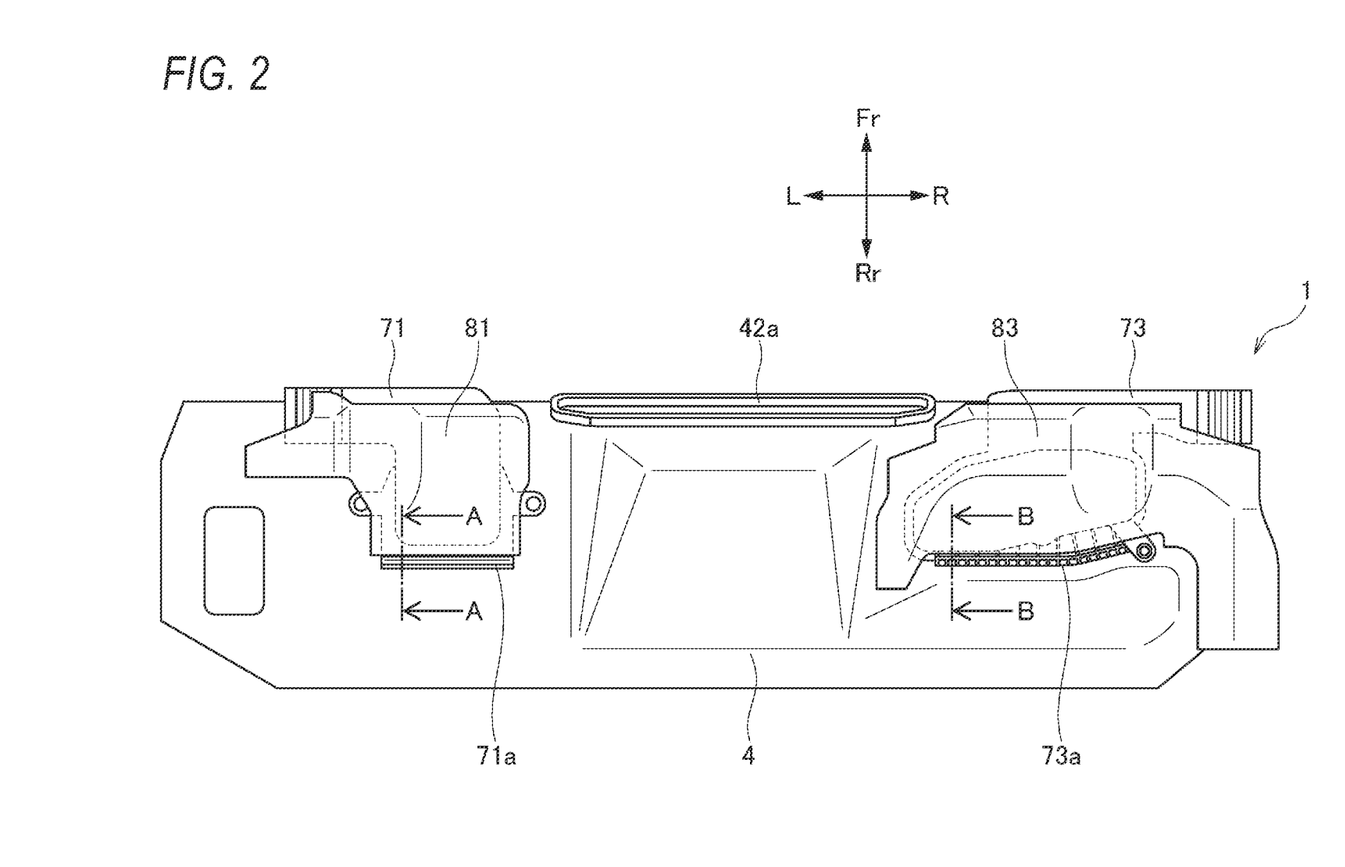
FIG. 2 is a plan view of a battery unit.
Figure 3:
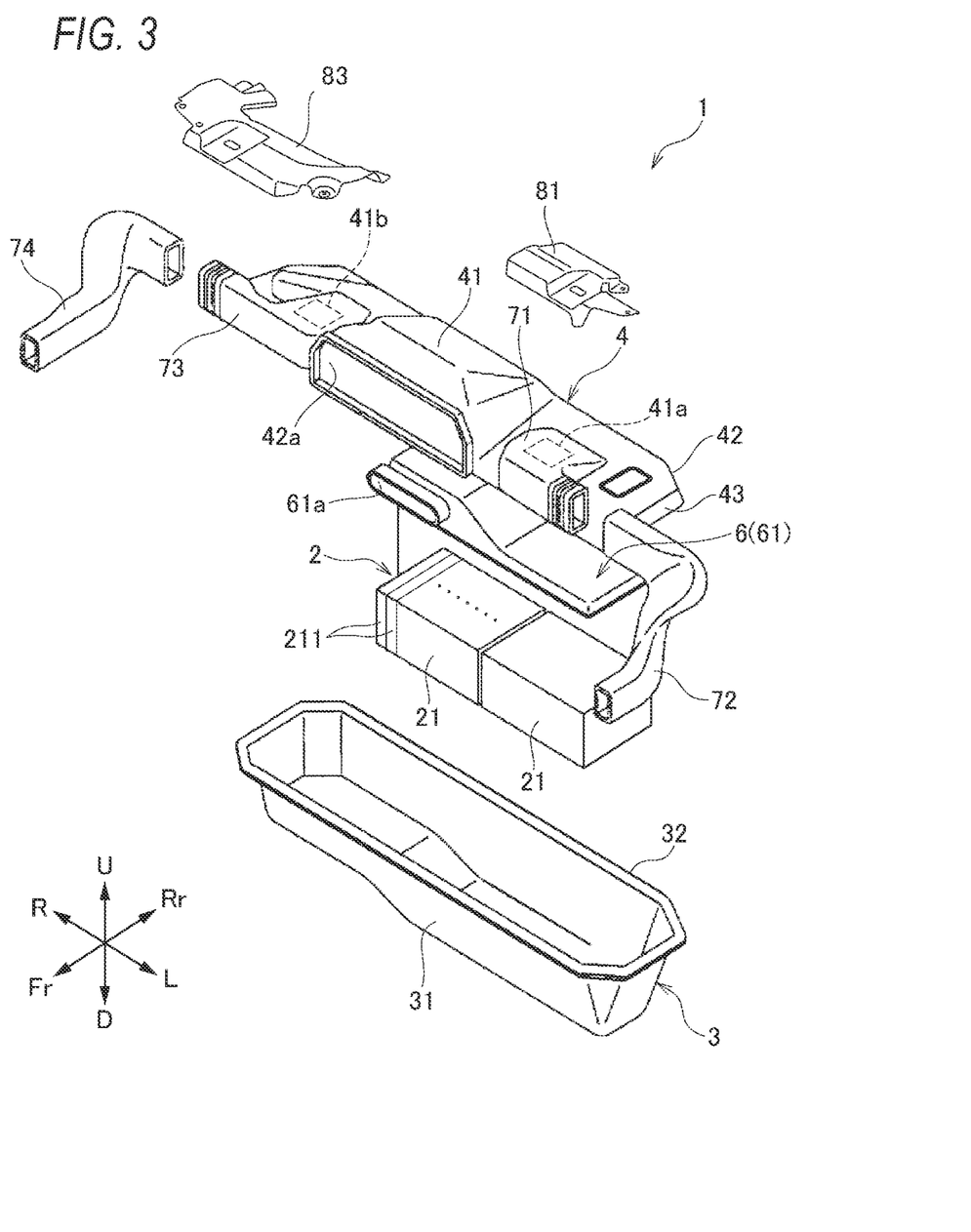
FIG. 3 is an exploded perspective view of the battery unit.

As illustrated in FIGS. 2 and 3, the battery unit 1 includes a case 3 and a lid 4 that covers an opening of the case 3, and accommodates a battery 2, a cooling component 6, and the like therein.

The case 3 is a resin member having a horizontally long and substantially rectangular parallelepiped shape with an upper opening, and has a case body 31 that opens upward, and an annular flange portion 32 that extends outward from an opening edge portion of the case body 31.

The lid 4 is a member that closes an opening of the case body 31, and includes a ceiling portion 41 that is formed in a substantially rectangular shape substantially corresponding to the opening of the case body 31, a vertical wall 42 that has a substantially rectangular frame shape and extends integrally from an outer peripheral edge of the ceiling portion 41, and a flange portion 43 that extends outward from a lower end edge portion of the vertical wall 42 over the entire circumference.

An intake port 42a for taking in air in the vehicle interior 11 into the battery unit 1 is formed on a surface of the vertical wall 42 that faces forward. In addition, exhaust ports 41a and 41b for discharging air in the battery unit 1 to the vehicle interior 11 are formed at two left and right positions of the ceiling portion 41.

The flange portion 43 is overlaid on the flange portion 32 of the case 3 via an annular sealing member (not shown). The overlapped flange portions 32 and 43 are fastened to the floor panel F via a plurality of bolts (not shown).

The battery 2 includes a plurality of battery modules 21. Each battery module 21 is formed by stacking a plurality of cells 211 in the vehicle width direction.

The cooling component 6 constitutes a cooling flow path in which air in the vehicle interior 11 is taken into the battery unit 1, the battery 2 is cooled with the taken-in air, and the air after cooling the battery 2 is discharged to the vehicle interior 11. The cooling component 6 includes an upper surface covering material 61, a fan (not shown), and the like.

The upper surface covering material 61 is a resin member that covers an upper surface of the battery 2 in the case 3, and a space through which air can flow is formed between the upper surface covering material 61 and the upper surface of the battery 2. Further, the upper surface covering material 61 is provided with an intake portion 61a through which air can be taken in from an outside of the case 3 to above the battery 2. The intake portion 61a opens forward, and takes in air from the vehicle interior 11 through the intake port 42a of the lid 4.

The fan is disposed below the battery 2, takes in air from above, and discharges the taken-in air laterally. Accordingly, the air in the vehicle interior 11 taken in from the intake port 42a of the lid 4 passes through the battery 2, and the battery 2 is cooled. The air discharged from the fan is discharged to the outside of the case 3 through the left and right exhaust ports 41a and 41b of the lid 4.

As illustrated in FIGS. 1 to 3, a left exhaust duct 71 is connected to the left exhaust port 41a, and the air discharged from the left exhaust port 41a is discharged to the vehicle interior 11 via the left exhaust duct 71 and a left extension duct 72 connected to the left exhaust duct 71.

In addition, a right exhaust duct 73 is connected to the right exhaust port 41b, and the air discharged from the right exhaust port 41b is discharged to the vehicle interior 11 via the right exhaust duct 73 and a right extension duct 74 connected to the right exhaust duct 73.

Figure 5:
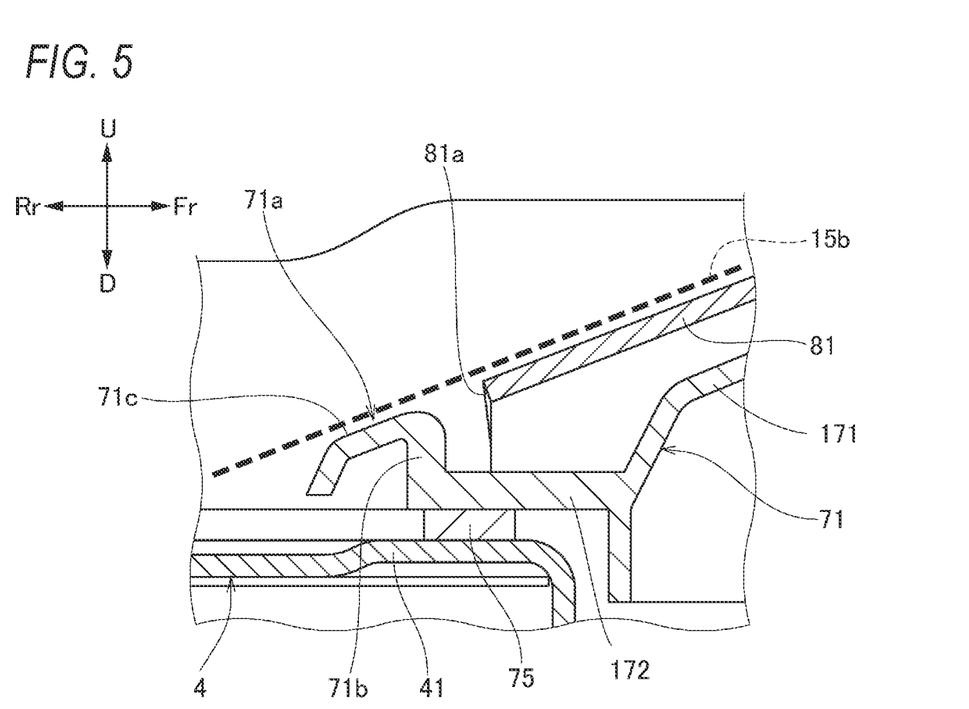
FIG. 5 is a cross-sectional view taken along a line A-A of FIG. 2.
Figure 7:
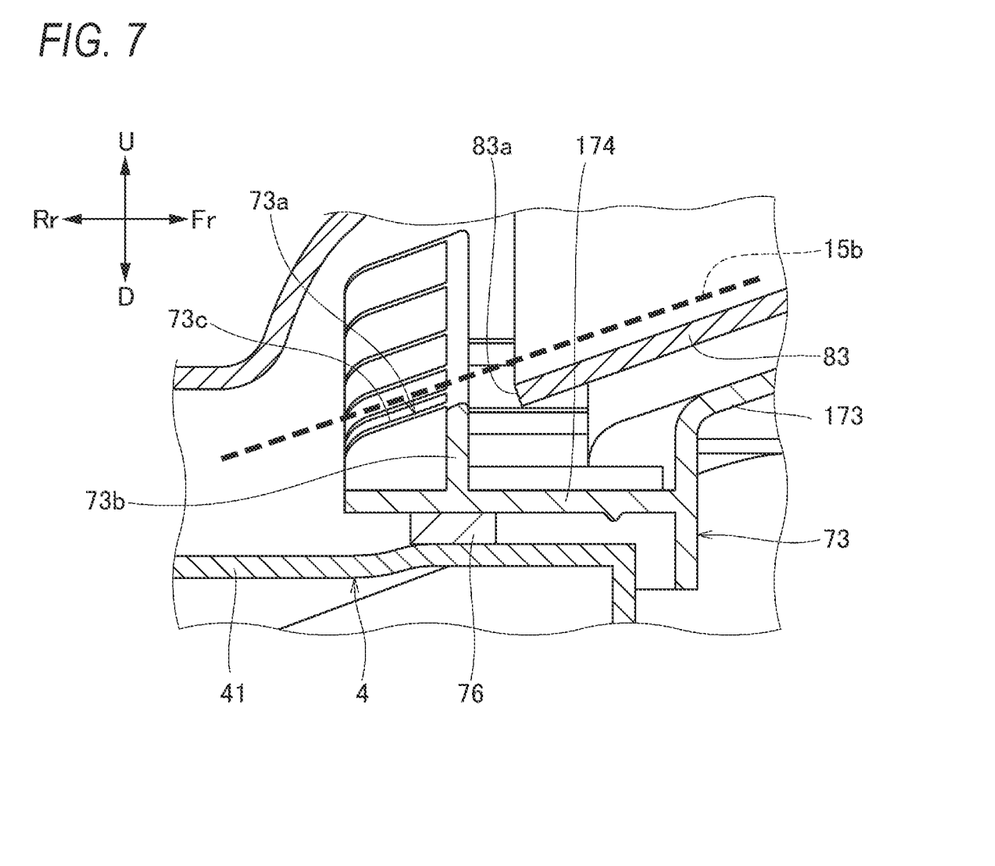
FIG. 7 is a cross-sectional view taken along a line B-B of FIG. 2.

The left and right exhaust ducts 71 and 73 are made of resin, and are attached to the lid 4 via seal members 75 and 76 that are disposed at peripheral edge portions of the left and right exhaust ports 41a and 41b, as illustrated in FIGS. 5 and 7. Accordingly, a space between the exhaust duct 71 and the lid 4 is sealed by the seal member 75 and a space between the exhaust duct 73 and the lid 4 is sealed by the seal member 76, and the air in the case 3 can be effectively discharged from the exhaust ducts 71 and 73.

As illustrated in FIGS. 2, 3, 5, and 7, a left exhaust duct cover 81 that covers an upper surface of the left exhaust duct 71 and a right exhaust duct cover 83 that covers an upper surface of the right exhaust duct 73 are disposed between the seat surface portion 15a of the rear seat 15 and the battery unit 1. The left and right exhaust duct covers 81 and 83 are made of metal, and protect the left and right exhaust ducts 71 and 73 made of resin when, for example, a load is applied downward from the seat surface portion 15a of the rear seat 15 via an occupant at the time of a frontal collision or the like of the vehicle. At this time, when the lower surface of the seat surface portion 15a comes into contact with edge portions 81a and 83a of the exhaust duct covers 81 and 83, the lower surface of the seat surface portion 15a may be broken or the edge portions 81a and 83a of the exhaust duct covers 81 and 83 may be caught by the lower surface of the seat surface portion 15a and may be turned over.

Although such a problem can be avoided by bending or folding the edge portions 81a and 83a of the exhaust duct covers 81 and 83 downward, such an avoidance measure results in an increase of processing cost. In addition, in the avoidance measure, in order to secure a clearance for avoiding contact between the exhaust duct cover 81 and the exhaust duct 71 and contact between the exhaust duct cover 83 and the exhaust duct 73, seal positions of the lid 4 with the exhaust ducts 71 and 73 need to be located on an inner side of the lid 4. Consequently, a flow path volume for cooling is reduced and cooling performance is affected.

The exhaust ducts 71 and 73 of the present embodiment are provided with contact portions 71a and 73a at positions facing the edge portions 81a and 83a of the exhaust duct covers 81 and 83 in the front-rear direction. The contact portions 71a and 73a come into contact with the lower surface 15b of the seat surface portion 15a when a load is input from the seat surface portion 15a. The contact portions 71a and 73a are provided at the rear end portions of duct flange portions 172 and 174 that extend in a horizontal direction from tubular duct bodies 171 and 173 that serve as exhaust flow paths.

According to the exhaust ducts 71 and 73, for example, when a load is applied downward from the seat surface portion 15a of the rear seat 15 via the occupant at the time of a frontal collision or the like of the vehicle, the contact portions 71a and 73a come into contact with the lower surface 15b of the seat surface portion 15a. Accordingly, the edge portions 81a and 83a of the exhaust duct covers 81 and 83 can be prevented from coming into contact with the lower surface 15b of the seat surface portion 15a, and damage to both the seat surface portion 15a and the exhaust duct covers 81 and 83 can be prevented. Further, by providing the contact portions 71a and 73a at the exhaust ducts 71 and 73, an increase in the number of components and an increase in cost can be prevented.

Predetermined gaps (clearance) are provided between the edge portions 81a and 83a of the exhaust duct covers 81 and 83 and the contact portions 71a and 73a in the front-rear direction, and are set such that the edge portions 81a and 83a do not come into contact with the contact portions 71a and 73a even when a load is applied downward from the seat surface portion 15a of the rear seat 15.

The contact portions 71a and 73a include vertical wall portions 71b and 73b that extend in a direction intersecting the lower surface 15b of the seat surface portion 15a. In this way, when a load is input from the seat surface portion 15a of the rear seat 15 to the contact portions 71a and 73a, the vertical wall portions 71b and 73b support the load. Accordingly, the possibility that the seat surface portion 15a comes into contact with the edge portions 81a and 83a of the exhaust duct covers 81 and 83 can be further lowered.

In addition, the contact portions 71a and 73a include contact surface portions 71c and 73c that are located on extension lines of upper surface portions of the exhaust duct covers 81 and 83 as viewed from a lateral side and that face the lower surface 15b of the seat surface portion 15a. In this way, the load can be received by the contact surface portions 71c and 73c, and the load acting on the contact portions 71a and 73a can be received in a dispersed manner.

Note that "being located on an extension line" is a concept including a case where a slight step exists, not limited to a case of complete coincidence. Further, it is preferable that the contact surface portions 71c and 73c are substantially parallel to the upper surface portions of the exhaust duct covers 81 and 83, but are not necessarily parallel to the upper surface portions of the exhaust duct covers 81 and 83.

Figure 4:
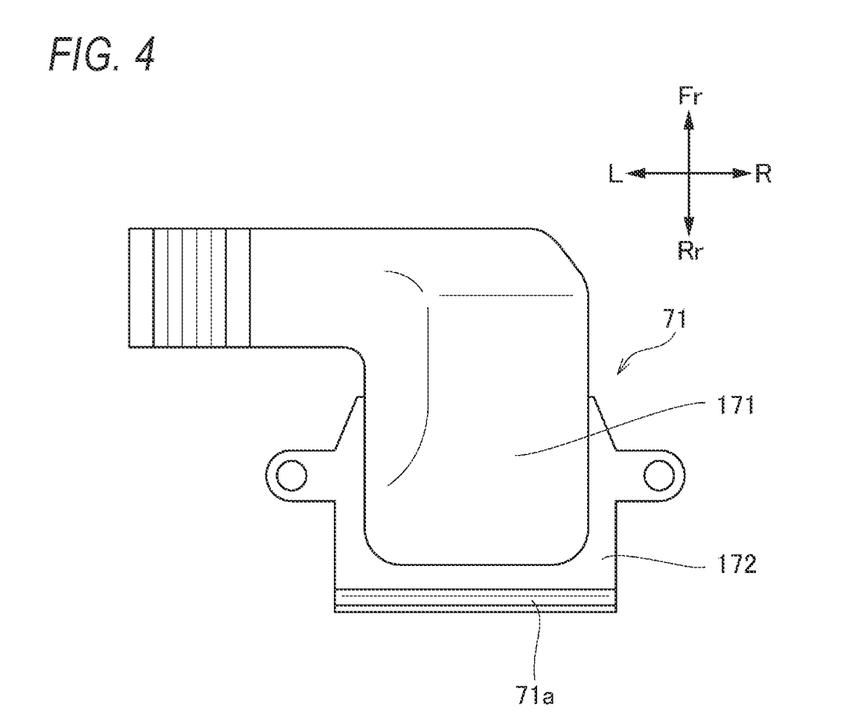
FIG. 4 is a plan view of a left exhaust duct.
Figure 6:
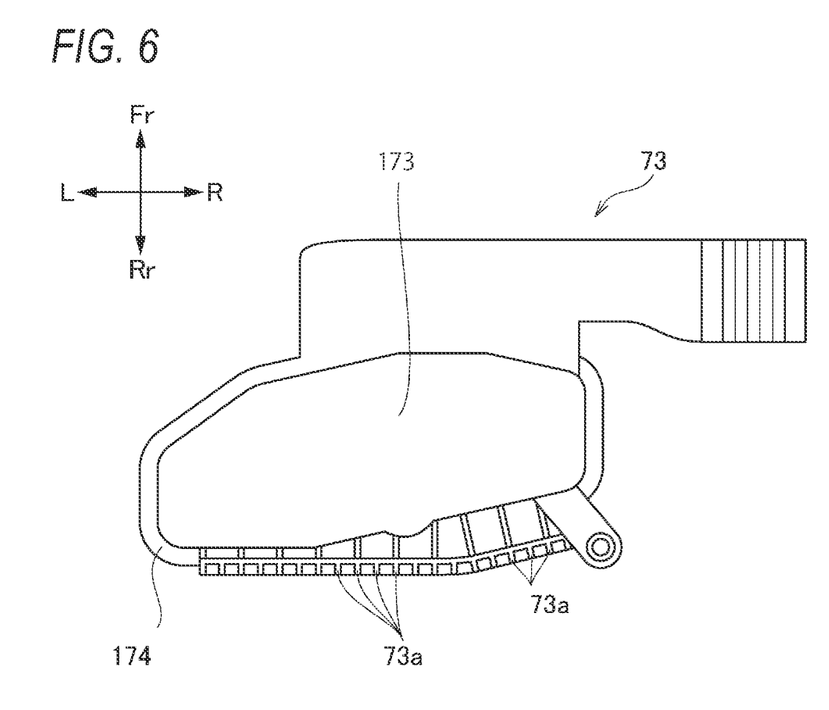
FIG. 6 is a plan view of a right exhaust duct.

As illustrated in FIG. 4, the contact portion 71a of the present embodiment is provided so as to extend continuously in a left-right direction at a rear end portion of the exhaust duct 71 (duct flange portion 172). On the other hand, as illustrated in FIG. 6, the contact portion 73a of the present embodiment is intermittently provided at predetermined intervals in the left-right direction at a rear end portion of the exhaust duct 73 (duct flange portion 174). Any of the modes of the contact portions 71a and 73a may be adopted, and the present invention is not limited thereto, and changes may be made as appropriate.

As illustrated in FIGS. 5 and 7, the contact portions 71a and 73a (contact surface portions 71c and 73c) extend outward (in the present embodiment, rearward) with respect to the seal members 75 and 76. In this way, it is possible to take measures against the contact with the seat surface portion 15a while securing the flow path volume for cooling, and thus it is possible to achieve both the cooling performance and durability of the rear seat 15.

The vertical wall portions 71b and 73b of the contact portions 71a and 73a are disposed at positions overlapping the seal members 75 and 76 as viewed from above. A pressure is applied to the seal members 75 and 76 in an up-down direction in order to seal the space between the lid 4 and the exhaust duct 71 and the space between the lid 4 and the exhaust duct 73. Although a reaction force is generated with respect to the exhaust ducts 71 and 73 as a result, since the vertical wall portions 71b and 73b of the contact portions 71a and 73a are disposed at the positions overlapping the seal members 75 and 76 as viewed from above, it is possible to prevent deformation of the exhaust ducts 71 and 73 caused by the reaction force of the seal members 75 and 76 and to ensure sealing performance.

Note that the above-described embodiment can be appropriately modified, improved, or the like.

For example, the plate member of the present invention may be a member other than the exhaust duct cover. In addition, the contact portion may be provided in a member other than the exhaust duct.

For example, although the cooling component 6 that cools the battery 2 has been described in the above-described embodiment, the cooling component 6 may not only cool the battery 2 but also heat the battery 2, or may mainly heat the battery 2.

At least the following matters are described in the present description. Although corresponding constituent elements or the like in the above-described embodiment are shown in parentheses, the present invention is not limited thereto.

(1) A power supply device mounting structure for a power supply device (battery unit 1) disposed below a seat (rear seat 15) disposed in a vehicle interior (vehicle interior 11), the power supply device mounting structure including:
  a plate member (exhaust duct covers 81 and 83) that is disposed between the power supply device and a seat surface portion (seat surface portion 15a) of the seat and that covers an upper surface of the power supply device; and
  a contact portion (contact portions 71a and 73a) that is provided at a position facing an edge portion (edge portions 81a and 83a) of the plate member and that comes into contact with the seat surface portion when a load is input from the seat surface portion.

According to (1), for example, when a load is applied downward from the seat surface portion of the seat via an occupant at the time of a frontal collision or the like of a vehicle, the contact portion comes into contact with a lower surface of the seat surface portion of the seat. Accordingly, the edge portion of the plate member can be prevented from coming into contact with the lower surface of the seat surface portion of the seat, and damage to both the seat surface portion of the seat and the plate member can be prevented.

(2) The power supply device mounting structure according to (1),
  in which the contact portion includes a vertical wall portion (vertical wall portions 71b and 73b) that extends in a direction intersecting a lower surface of the seat surface portion.

According to (2), since the vertical wall portion can support a load when the load is input from the seat surface portion of the seat to the contact portion, the contact of the seat surface portion of the seat with the edge portion of the plate member can be further prevented.

(3) The power supply device mounting structure according to (1) or (2),
  in which the plate member includes an upper surface portion that faces the lower surface of the seat surface portion, and
  in which the contact portion includes a contact surface portion (contact surface portions 71c and 73c) that is located on an extension line of the upper surface portion as viewed from a lateral side and that faces the lower surface of the seat surface portion.

According to (3), since the contact surface portion of the contact portion is located on the extension line of the upper surface portion of the plate member as viewed from the lateral side and faces the lower surface of the seat surface portion, the load is received by the contact surface portion, and thus the load acting on the contact portion can be received in a dispersed manner.

(4) The power supply device mounting structure according to (3),
  in which the power supply device includes:
    a battery (battery 2) that supplies electric power;
    a battery cover (lid 4) that covers an upper surface of the battery.
    a case (case 3) that accommodates the battery and is fastened to the battery cover;
    an exhaust duct (exhaust ducts 71 and 73) that is connected to an exhaust port (exhaust ports 41a and 41b) of the battery cover and through which air in the case is discharged to an outside of the case; and
    an exhaust duct cover (exhaust duct covers 81 and 83) that covers an upper surface of the exhaust duct,
  in which the plate member is configured with the exhaust duct cover, and
  in which the contact portion is provided at an end portion of the exhaust duct.

According to (4), by providing the contact portion in the exhaust duct, an increase in the number of components can be prevented.

(5) The power supply device mounting structure according to (4),
  in which the power supply device further includes a seal member (seal members 75 and 76) that is disposed so as to seal a space between the battery cover and the exhaust duct, and
  in which the contact portion extends outward with respect to the seal member.

According to (5), the seal member seals the space between the exhaust duct and the battery cover, so that an exhaust gas in the case can be effectively discharged from the exhaust duct. At this time, since a portion on an inner side of the seal member is an exhaust flow path in the power supply device, the contact portion provided at the end portion of the exhaust duct is extended outward with respect to the seal member, so that it is possible to take measures against the contact with the seat surface portion of the seat while securing a flow path volume. Accordingly, both durability of the seat and cooling performance can be achieved.

(6) The power supply device mounting structure according to (5),
 in which the contact portion includes:
  the vertical wall portion (vertical wall portions 71*b* and 73*b*) that extends in a direction intersecting the lower surface of the seat surface portion; and
  the contact surface portion (contact surface portions 71*c* and 73*c*) that extends outward from the vertical wall portion with respect to the seal member, and
 in which the vertical wall portion is disposed at a position overlapping the seal member as viewed from above.

In order to seal a space between the battery cover and the exhaust duct, a pressure is applied to the seal member in an up-down direction. Although a reaction force is generated with respect to the exhaust duct as a result, according to (6), since the contact portion includes the vertical wall portion, rigidity of the exhaust duct can be increased, and deformation of the exhaust duct can be prevented even when the reaction force is received, and thus sealing performance can be ensured.

What is claimed is:

1. A power supply device mounting structure for a power supply device disposed below a seat disposed in a vehicle interior, the power supply device mounting structure comprising:
 a plate member that is disposed between the power supply device and a seat surface portion of the seat and that covers an upper surface of the power supply device and that has an edge portion; and
 a contact portion that is provided in the vehicle interior at a rearward side of the edge portion of the plate member and that comes into contact with the seat surface portion when a load is input from the seat surface portion, the edge portion being positioned at the rearward side of the vehicle interior.

2. The power supply device mounting structure according to claim 1,
 wherein the contact portion includes a vertical wall portion that extends in a direction intersecting a lower surface of the seat surface portion.

3. The power supply device mounting structure according to claim 1,
 wherein the plate member includes an upper surface portion that faces a lower surface of the seat surface portion, and
 wherein the contact portion includes a contact surface portion that is located on an extension line of the upper surface portion as viewed from a lateral side and that faces the lower surface of the seat surface portion.

4. The power supply device mounting structure according to claim 3,
 wherein the power supply device includes:
  a battery that supplies electric power;
  a battery cover that covers an upper surface of the battery;
  a case that accommodates the battery and is fastened to the battery cover;
  an exhaust duct that is connected to an exhaust port of the battery cover and through which air in the case is discharged to an outside of the case; and
  an exhaust duct cover that covers an upper surface of the exhaust duct,
 wherein the plate member is configured with the exhaust duct cover, and
 wherein the contact portion is provided at an end portion of the exhaust duct.

5. The power supply device mounting structure according to claim 4,
 wherein the power supply device further includes a seal member that is disposed so as to seal a space between the battery cover and the exhaust duct, and
 wherein the contact portion extends outward with respect to the seal member.

6. The power supply device mounting structure according to claim 5,
 wherein the contact portion includes:
  a vertical wall portion that extends in a direction intersecting the lower surface of the seat surface portion; and
  the contact surface portion that extends outward from the vertical wall portion with respect to the seal member, and
 wherein the vertical wall portion is disposed at a position overlapping the seal member as viewed from above.

* * * * *